9275X
L. V. BADGER.
Cupola Furnace.
Patented Dec. 2, 1835.
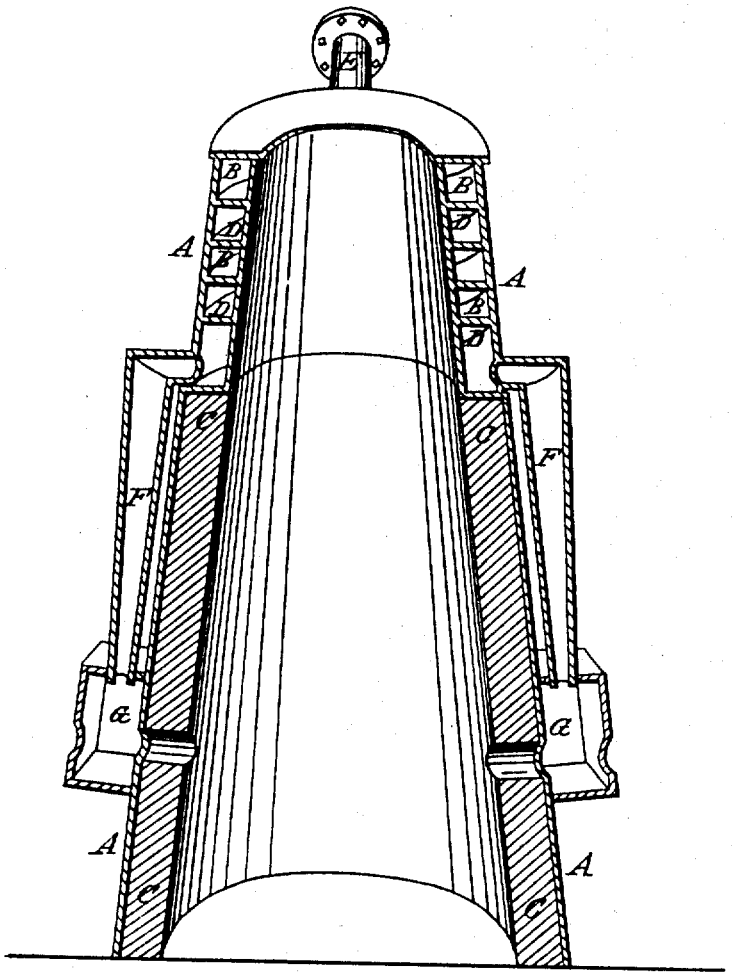
AM. PHOTO-LITHO. CO. N.Y. (OSBORNE'S PROCESS.)

9275X

Dec 2 1835 447

Leonidas V. Badger. of Portsmouth N. H.

Letters Patent

The Schedule referred to in these Letters Patent and making part of the same containing a description in the words of the said Leonidas V. Badger himself of his improvement in the Hot air and Cupola Furnace To all to whom these presents shall come. Be it known that I Leonidas V. Badger of Portsmouth in the County of Rockingham and State of New Hampshire, has invented constructed and applied to use a new and useful improvement called the "Hot air Cupola Furnace" of which the following is a full and exact description The furnace consists of two conical cylinders about four feet ten inches in height, the bottom end of one three feet diameter, the top two feet, the other one inch in diameter less, having a space when placed on the bottom of about one inch. The bottom is arranged in the usual way of common Cupola furnaces on the top of cylinder or body of furnace is a ring projecting with a moulding running back four inches the thickness of the Brick lining to receive the two cylinders which I call the hot air cylinders, these are to be arranged that the outside shall be on a line with the furnace body and shall be half the height of the same, one other cylinder of the same length four inches less in diameter to be placed on a ring on the inside leaving a chamber for the air of four inches in the clear, which being the same as the thickness of the Brick lining, will leave the regularity of the cone on the interior of the furnace equal and perfect. On the top of these air chamber cylinders, is to be a ring filled with the moulding. on the interior of this air chamber, is a Spiral Plate running entirely round several times leaving the distance between of about four inches making moreally a circuitous pipe of four inches square, or it may be divided by partitions or any other mode that will give the continuous chamber for the air. on the back side of the cylinder at the upper end a hole is to be cast for the Bellows pipe to be connected at the two opposite sides. on the bottom edge two holes are left for the supply pipes which end in air tight chests. These chests should be about eight inches square and four inches deep secured at the hinges to the sides of the furnace. The pipe at the end which enters the chest is to be turned to fit tight that all variations in the whole work caused by contraction and expansion of the metal may be overcome. The whole may be made of cast or sheet iron, and secured together by bolts. The model I have made with the body formed of one cylinder to shew more readily the mode arranging the pipes &c. or it may be used with a single cylinder, the whole furnace is to be secured on a foundation in the usual way. What I claim as my invention is the double cylinder at the top of the furnace forming a circular chamber for the air heating the blast from the flame of the furnace thereby causing a great saving of fuel and time. Also I claim the double cylinder to the body of furnace preventing the escape of the heat by the confined air between the two cylinders Witnesses
Brackett Hutchings
W. H. H. Hacket L V Badger Exd
[illegible]

(630 words)

(Patented 2 Decr 1835)
(Drawing)